United States Patent
Yoshitake

(10) Patent No.: US 8,638,462 B2
(45) Date of Patent: Jan. 28, 2014

(54) IMAGE DISPLAY APPARATUS AND METHOD OF CONTROLLING THE SAME

(75) Inventor: Michio Yoshitake, Onga-cho (JP)

(73) Assignee: Seiko Epson Corporation, Tokyo (JP)

( * ) Notice: Subject to any disclaimer, the term of this patent is extended or adjusted under 35 U.S.C. 154(b) by 457 days.

(21) Appl. No.: 13/091,069

(22) Filed: Apr. 20, 2011

(65) Prior Publication Data

US 2011/0261406 A1 Oct. 27, 2011

(30) Foreign Application Priority Data

Apr. 21, 2010 (JP) ................................. 2010-097607

(51) Int. Cl.
*G06F 3/12* (2006.01)

(52) U.S. Cl.
USPC ........... 358/1.15; 358/1.2; 358/1.9; 358/3.24; 358/3.26; 358/448; 345/68; 345/104

(58) Field of Classification Search
USPC ........ 358/1.2, 1.6, 1.9, 3.24, 3.26, 3.27, 1.15, 358/443, 445, 447, 448, 471; 345/619, 625, 345/519, 520, 522, 55, 68, 104; 348/14.04, 348/14.12, 14.14, 21, 46, 51, 53, 58, 60, 69, 348/75, 184, 189, 191, 192, 193, 222.1, 348/228.1, 241, 246, 333.01, 333.02, 266, 348/390.1, 393.1
See application file for complete search history.

(56) References Cited

FOREIGN PATENT DOCUMENTS

JP 2001-134356 A 5/2001

*Primary Examiner* — Vu B Hang
(74) *Attorney, Agent, or Firm* — Kilpatrick Townsend & Stockton LLP

(57) ABSTRACT

In an image display apparatus, when image data is transferred from an LCD controller to an LCD through a transmission cable having a plurality of signal lines and is displayed on a screen, the image data is divided sequentially by a plurality of lines from a front line so as to correspond to the number of signal lines and allocates the divided image data to the signal lines such that image data of which signal change is larger is allocated to a signal line which is closer to the ground line to transfer the image data. Therefore, the entire radiation noise which is generated can be reduced while maintaining quality of signals.

8 Claims, 9 Drawing Sheets

IMAGE DISPLAY APPARATUS AND METHOD OF CONTROLLING THE SAME

BACKGROUND

1. Technical Field

The present invention relates to an image display apparatus and a program. The image display apparatus includes a display unit and a controller connected to the display unit through a plurality of signal lines and a ground line. In the image display apparatus, an image signal is transferred from the controller to the display unit through the plurality of signal lines so that an image is displayed.

2. Related Art

An existing device in which a main control plate on which a CPU is mounted and a print head control plate which controls a head driver are connected to each other through a transmission cable, and when a signal such as image data is transmitted between the two control plates, a signal voltage is lowered and the signal is output to the transmission cable has been proposed (for example, see JP-A-2001-134356). In the control circuit, a signal of 5V as an internal voltage of the control plate is lowered to 3.3 V so as to reduce power of the signal itself. This makes it possible to suppress radiation noise and induction noise from being generated.

However, in the above device, although noise can be suppressed from being generated, power of the signal itself is reduced. Therefore, signal quality is deteriorated and reliability of signal transmission is deteriorated in some case.

SUMMARY

An advantage of some aspects of the invention is to provide an image display apparatus and a program which suppress noise from being generated when an image signal is transferred through a signal line while maintaining signal quality.

An image display apparatus and a program according to aspects of the invention employ the following apparatuses and methods in order to obtain the above advantage.

An image display apparatus according to an aspect of the invention includes a display unit and a controller connected to the display unit through a plurality of signal lines and a ground line, and displays an image by transferring an image signal from the controller to the display unit through the plurality of signal lines. The image display apparatus includes a transmission unit which is provided at the side of the controller with respect to the signal lines, divides the image signal into up to the number of signal lines in a predetermined order to analyze the divided image signals, and allocates the analyzed image signals to the signal lines such that an image signal of which signal change is larger among the analyzed image signals is allocated to a signal line which is closer to the ground line to transfer the image signals together with correspondence relationship between the image signals and the allocated signal lines to the side of the display unit, and a reception unit which is provided at the side of the display unit with respect to the signal lines inputs the image signals and the correspondence relationship from the transmission unit, restores the input image signals to an original order using the input correspondence relationship to output the image signals to the display unit.

The image display apparatus according to the aspect of the invention includes the display unit and the controller which are connected to each other through the plurality of signal lines and the ground line. In the image display apparatus, an image signal is transferred from the controller to the display unit through the plurality of signal lines so as to display an image. Further, in the image display apparatus, the transmission unit which is provided at the side of the controller with respect to the signal lines sequentially divides the image signal into up to the number of signal lines to analyze the divided image signals, and allocates the analyzed image signals to the signal lines such that an image signal of which signal change is larger among the analyzed image signals is allocated to a signal line which is closer to the ground line to transfer the image signals together with correspondence relationship between the image signals and the allocated signal lines to the side of the display unit. The reception unit which is provided at the side of the display unit with respect to the signal lines inputs the image signals and the correspondence relationship from the transmission unit, and restores the input image signals to an original order using the input correspondence relationship to output the image signals to the display unit. With this, when an image signal is transferred using the plurality of signal lines, a noise level can be reduced while maintaining quality of the image signals.

In the image display apparatus according to the aspect of the invention, it is preferable that the transmission unit be a transmitting unit to calculate the ratio of ON signals in one cycle of each of the image signals and allocate the image signals to the signal lines such that an image signal of which calculated ratio is larger is allocated to a signal line which is closer to the ground line to transfer the image signals. With this, through the simple calculation, a signal of which change is larger among image signals can be specified.

Further, in the image display apparatus according to the aspect of the invention, it is preferable that the transmission unit be a transmitting unit to transfer the correspondence relationship before each of the image signals is transferred. With this, the reception unit can smoothly output the received image signals to the display unit.

Further, in the image display apparatus according to the aspect of the invention, it is preferable that the transmission unit be a transmitting unit to divide the image signals on a line basis, and allocate the divided image signals to the plurality of signal lines to transfer the image signals to the reception unit.

In a method of transferring an image signal from a controller to a display unit through a plurality of signal lines according to another aspect of the invention, the display unit and the controller are electrically connected to each other through a ground line and the plurality of signal lines, and an image signal of which signal change is the largest among image signals which are simultaneously transmitted through the signal lines is transferred through a signal line which is the closest to the ground line. With this, when an image signal is transferred by using a plurality of signal lines, a noise level can be reduced while maintaining quality of the image signals.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
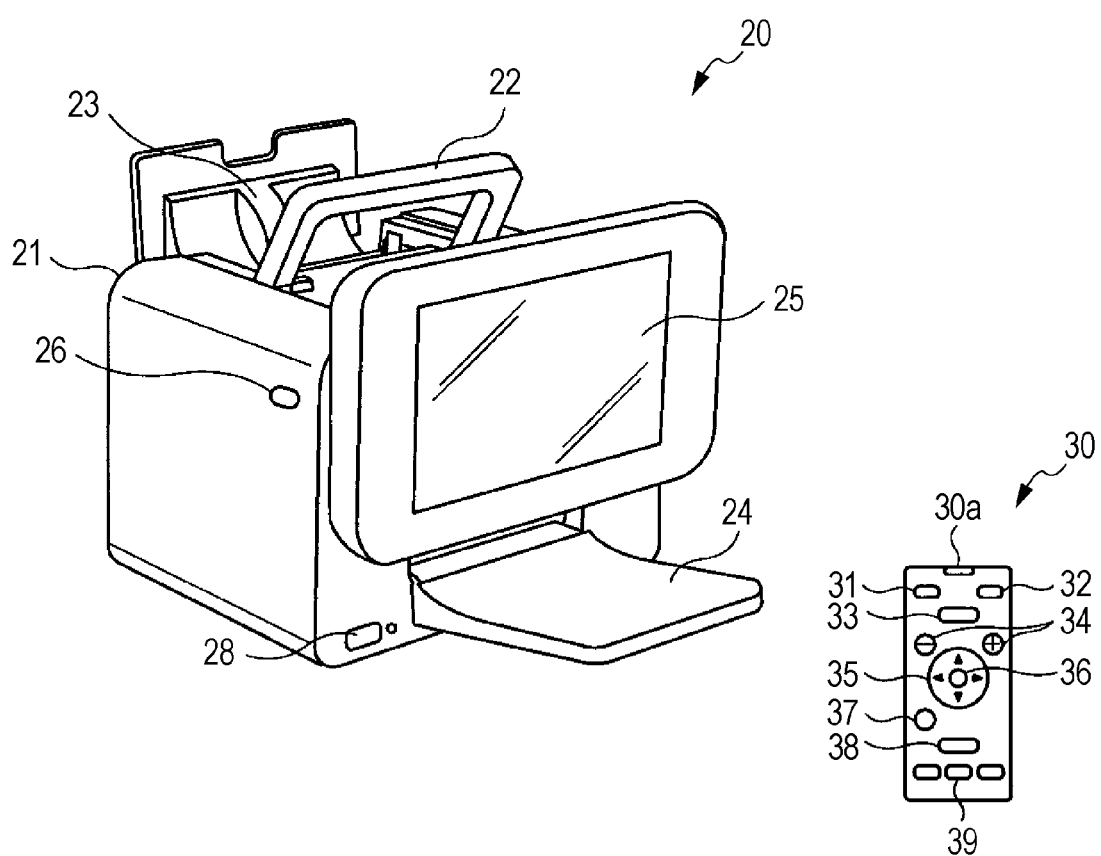
FIG. 1 is an external perspective view illustrating a printer according to the embodiment.
Figure 2:
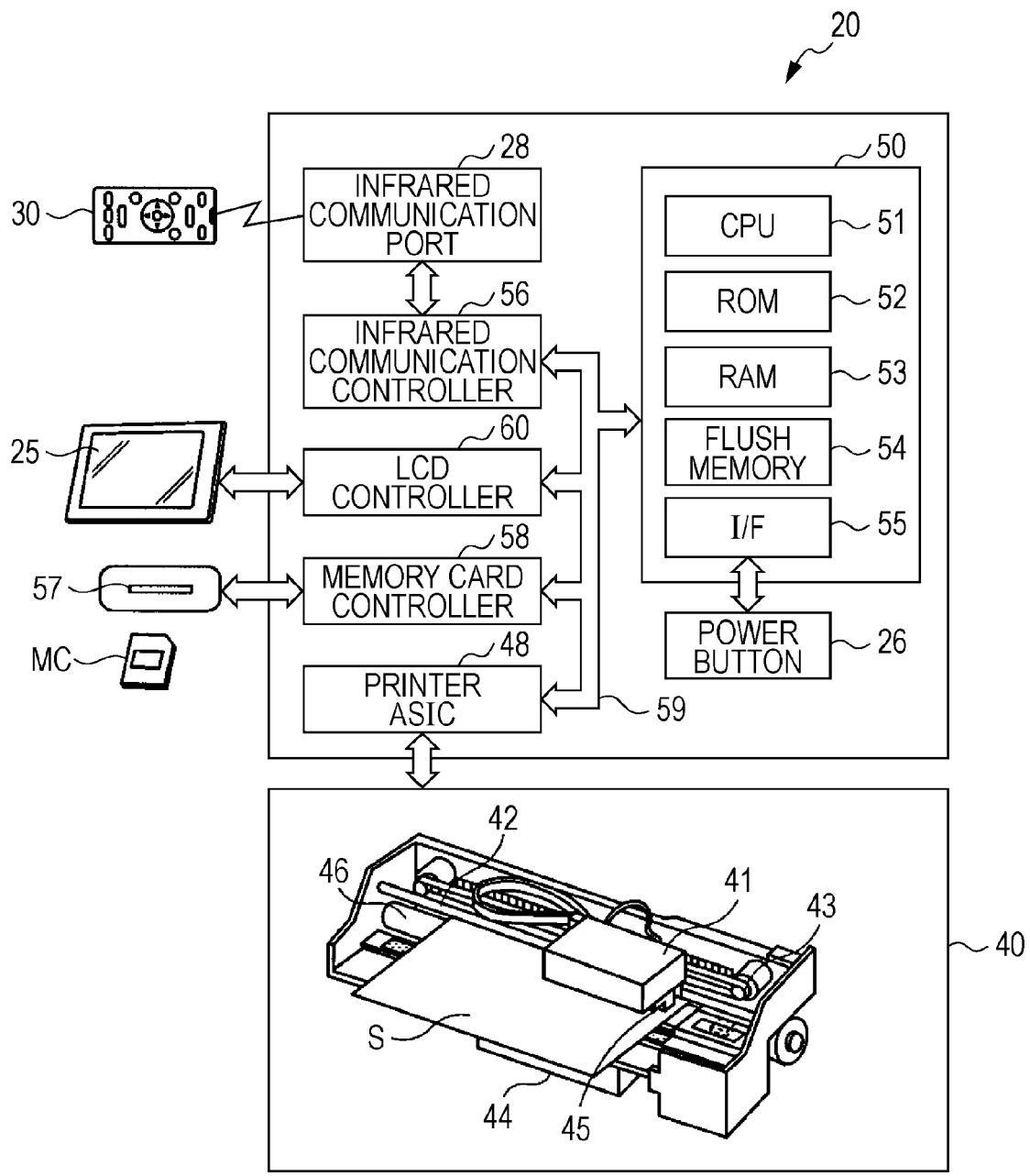
FIG. 2 is a functional block diagram illustrating the printer according to the embodiment.

Hereinafter, an embodiment of the invention is described with reference to the drawings. FIG. 1 is an external perspective view illustrating external appearance of a printer 20 as an embodiment of the invention. FIG. 2 is a block diagram illustrating functional blocks of the printer 20 according to the embodiment.

The printer 20 according to the embodiment is configured as a photo printer in which a printing mechanism 40 (see, FIG. 2) is integrated and which performs printing on an L-sized sheet. As the external appearance of the printer 20, a handle 22, an auto sheet feeder 23, a sheet discharge tray 24, a liquid crystal display (LCD) 25, and a power button 26 are provided as illustrated in FIG. 1. The handle 22 is provided on an upper surface of a main body 21 so as to carry the main body 21. The auto sheet feeder 23 is provided on a rear surface of the main body 21 so as to automatically feed a set sheet. The sheet discharge tray 24 and the liquid crystal display (LCD) 25 are provided on a front surface of the main body 21. The sheet discharge tray 24 holds a sheet which has been printed by the printing mechanism 40. Pictures and setting at the time of the printing are checked with the liquid crystal display (LCD) 25. The power button 26 is provided on a side surface of the main body 21. Power is turned ON/OFF with the power button 26. Further, an infrared communication port 28 (light receiving unit) is provided on the front surface of the main body 21 at a position adjacent to the sheet discharge tray 24. A remote control device 30 is operated in a state where a light emitting unit 30a is directed to the infrared communication port 28 so that the printer 20 can be remotely controlled. It is to be noted that the remote control device 30 includes a power button 31, a stop/reset button 32, a top menu button 33, print number setting buttons 34, up/down/left/right buttons 35, an OK button 36, a return button 37, a print button 38, and setting buttons 39 as a button group for remotely operating the printer 20. The power button 31 is a button for turning the power ON/OFF. The stop/reset button 32 is a button for stopping printing when being pressed during printing and canceling the number of sheets to be printed or selection of photographs when being pressed on a photograph selection screen. The top menu button 33 is a button for displaying a top menu screen. The print number setting buttons 34 are buttons for setting the number of sheets to be printed. The up/down/left/right buttons 35 are buttons for selecting an item or a setting value. The OK button 36 is a button for determining an item or proceeding to a next screen. The return button 37 is a button for returning to a previous screen. The print button 38 is a button for starting printing. The setting buttons 39 are buttons for displaying a setting screen.

The printing mechanism 40 includes a carriage 41, ink cartridges 44, a print head 45, and a transportation roller 46 as illustrated in FIG. 2. The carriage 41 is driven by a carriage belt 43 so as to reciprocate along a guide 42 in the horizontal direction. The carriage belt 43 is bridged in a loop form in the horizontal direction (main scanning direction). The ink cartridges 44 supply inks of colors such as cyan, magenta, yellow, and black to the carriage 41. The print head 45 applies pressure to each ink supplied from each of the ink cartridges 44 to discharge the ink toward a sheet S through nozzles. The transportation roller 46 transports the sheet S in the sub scanning direction. The ink cartridges 44 are so-called off-carriage type. That is, the ink cartridges 44 are attached to a lower portion of the printing mechanism 40 and are not mounted on the carriage 41. The print head 45 employs a system in which a voltage is applied to piezoelectric elements to deform the piezoelectric elements so that ink is pressurized. However, a system in which a voltage is applied to a heat generation resistor (for example, heater or the like) to heat ink so that ink is pressurized with generated air bubbles may be employed.

The LCD 25 receives display control by the LCD controller 60 so as to display characters, figures, symbols, and the like. In the embodiment, the LCD 25 is formed by pixels of 960 dots×240 dots. Image data of 960 dots forms one line and line data of 240 lines forms one frame (one image).

Further, the printer 20 according to the embodiment includes a main controller 50, a printer ASIC 48, an infrared communication controller 56, the LCD controller 60, and a memory card controller 58 as a control system as illustrated in FIG. 2. The main controller 50 controls the entire printer. The printer ASIC 48 controls the printing mechanism 40. The infrared communication controller 56 processes an infrared signal input through the infrared communication port 28 as an operation signal. The LCD controller 60 controls display of the LCD 25. The memory card controller 58 controls writing or reading-out of data onto or from a memory card MC inserted into a memory card slot 57. These components are electrically connected to each other through a bus 59.

The main controller 50 is configured as a microprocessor centered on a CPU 51 and includes a ROM 52, a RAM 53, a flush memory 54, and an interface (I/F) 55. The ROM 52 stores various processing programs, various data, various tables, and the like. The RAM 53 temporarily stores data. Data in the flush memory 54 can be electrically rewritable and held even when the power is turned OFF. The interface (I/F) 55 inputs an operation signal from the power button 26. The main controller 50 inputs an image file and the like from the memory card MC inserted into the memory card slot 57 and inputs an operation signal from the infrared communication controller 56, an detection signal from each part of the printing mechanism 40, and the like. Further, the main controller 50 stores editing images and the like in the memory card MC and outputs a direction signal to the printer ASIC 48 and a control signal to the LCD controller.

Figure 3:
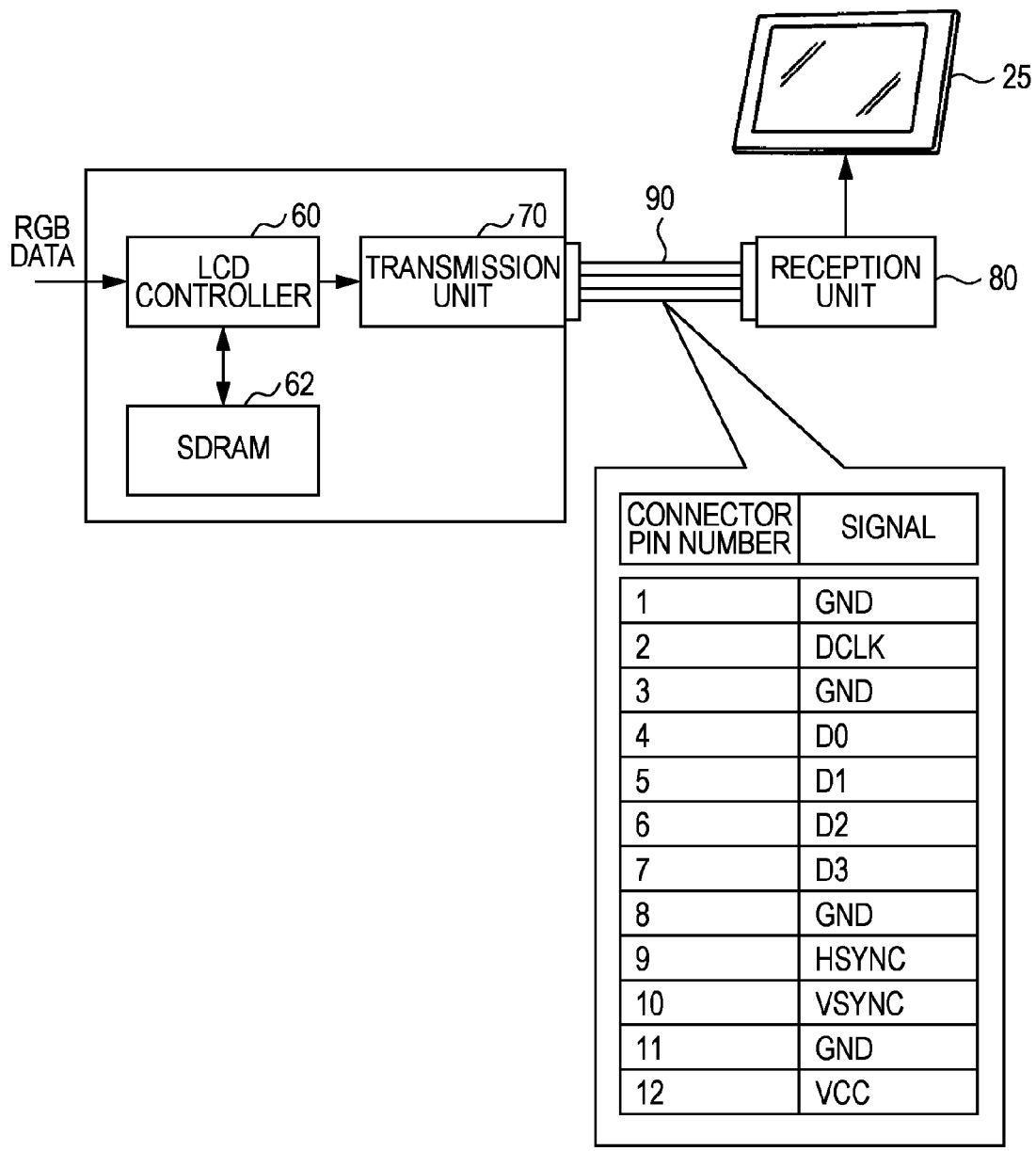
FIG. 3 is a schematic diagram illustrating a signal transmission system between an LCD controller and an LCD.
Figure 4:
FIG. 4 is a descriptive diagram illustrating a transfer form of image data.

FIG. 3 is a configuration diagram illustrating a schematic configuration of a signal transmission system between the LCD controller 60 and the LCD 25. As illustrated in FIG. 3, a transmission unit 70 is provided at the side of the LCD controller 60 and a reception unit 80 is provided at the side of the LCD 25. The transmission unit 70 and the reception unit 80 are connected to each other through a transmission cable 90. As illustrated in FIG. 3, the transmission cable 90 is configured as a flexible flat cable. In the flexible flat cable, a ground line GND of which connector pin number is 1, a clock line DCLK of which connector pin number is 2, a ground line GND of which connector pin number is 3, a signal line D0 of which connector pin number is 4, a signal line D1 of which connector pin number is 5, a signal line D2 of which connector pin number is 6, a signal line D3 of which connector pin number is 7, a ground line GND of which connector pin number is 8, a horizontal synchronization line HSYNC of which connector pin number is 9, a vertical synchronization signal VSYNC of which connector pin number is 10, a ground line GND of which connector pin number is 11, and a power line VCC of which connector pin number is 12 are arranged in this order. The clock line DCLK defines a timing at which data of one pixel is read out. In the embodiment, image data is transferred from the LCD controller 60 to the LCD 25 using four signal lines D0 to D3 of which connector pin numbers are 4 to 7. FIG. 4 illustrates a transfer form of the image data. Reference numerals P0, 0 to P0, n (n represents resolution in the horizontal direction) in FIG. 4 indicate pixel data on a $0^{th}$ line. Reference numerals P1, 0 to P1, n indicate pixel data on a $1^{st}$ line. Reference numerals P2, 0 to P2, n indicate pixel data on a $2^{nd}$ line. Reference numerals P3, 0 to P3, n indicate pixel data on a $3^{rd}$ line. It is to be noted that one pixel is formed by R0 to R7 as bit data of R (red) of $0^{th}$ to $7^{th}$ bits, G0 to G7 as bit data of G (green) of $0^{th}$ to $7^{th}$ bits, B0 to B7 as bit data of B (blue) of $0^{th}$ to $7^{th}$ bits. The data transmission is performed by sequentially allocating image data to the signal lines D0 to D3 on a line basis as illustrated in FIG. 4 and simultaneously transmitting the image data.

Figure 5:
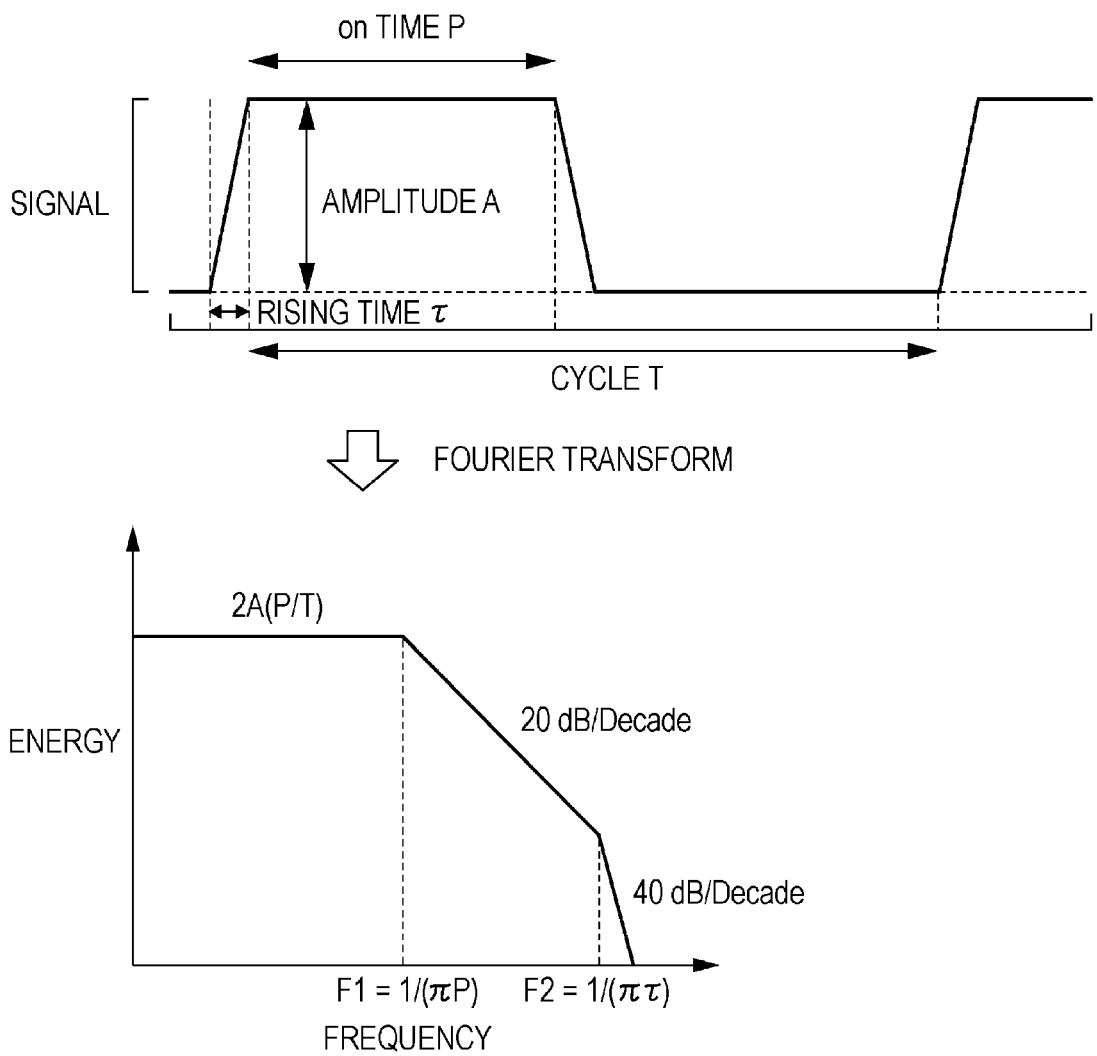
FIG. 5 is a descriptive diagram illustrating a relationship between frequency and energy of a signal.

FIG. 5 is a descriptive diagram illustrating a relationship between frequency and energy of a signal passing through the transmission cable 90. The signal passing through the transmission cable 90 is considered as a signal wave of which signal rising cycle is T, signal rising time is τ, amplitude of a signal voltage is A, and ON period (period of signal 1) is P. If the signal wave is subjected to Fourier transform, energy of the signal is as follows as illustrated in FIG. 5. That is, the energy of the signal is 2A (P/T) until the frequency reaches to F1 ($=1/(\pi P)$). When the frequency is higher than F1, the energy of the signal decays at 20 dB/Decade until the frequency reaches to F2 ($=1/(\pi\tau)$). Further, the energy of the signal decays at 40 dB/Decade when the frequency is higher than F2. Accordingly, as 2A (P/T) of a signal is larger (P/T of a signal is larger when the amplitude A is fixed), radiation noise generated when the signal passing through the transmission cable 90 is increased.

The LCD controller 60 inputs image data (RGB data) for one frame from the main controller 50 and stores the image data in an SDRAM 62 as a VRAM. If a vertical synchronization signal VSYNC is output from a synchronization signal generation unit (not shown), the LCD controller 60 reads out the image data for one frame sequentially from a front line. Further, every time the horizontal synchronization signal HSYNC is output, the LCD controller 60 reads out image data for four lines so as to output the image data to the transmission unit 70. The transmission unit 70 which has been input the image data for four lines allocates the input image data for four lines to four signal lines D0 to D3, respectively, while rearranging the order of the image data on the line basis. Further, the transmission unit 70 simultaneously transfers the image data for four lines to the reception unit 80. If the reception unit 80 receives image data for four lines from the transmission unit 70, the reception unit 80 restores the order of the image data to an original order and sequentially outputs the image data to the LCD 25 so as to display an image on the LCD 25. A case in which the order of the image data is rearranged and is transferred is described in detail later.

Next, operations of the printer 20 according to the embodiment as described above, in particular, operations of the transmission unit 70 and the reception unit 80 are described. At first, the operations of the transmission unit 70 are described.

Figure 6:
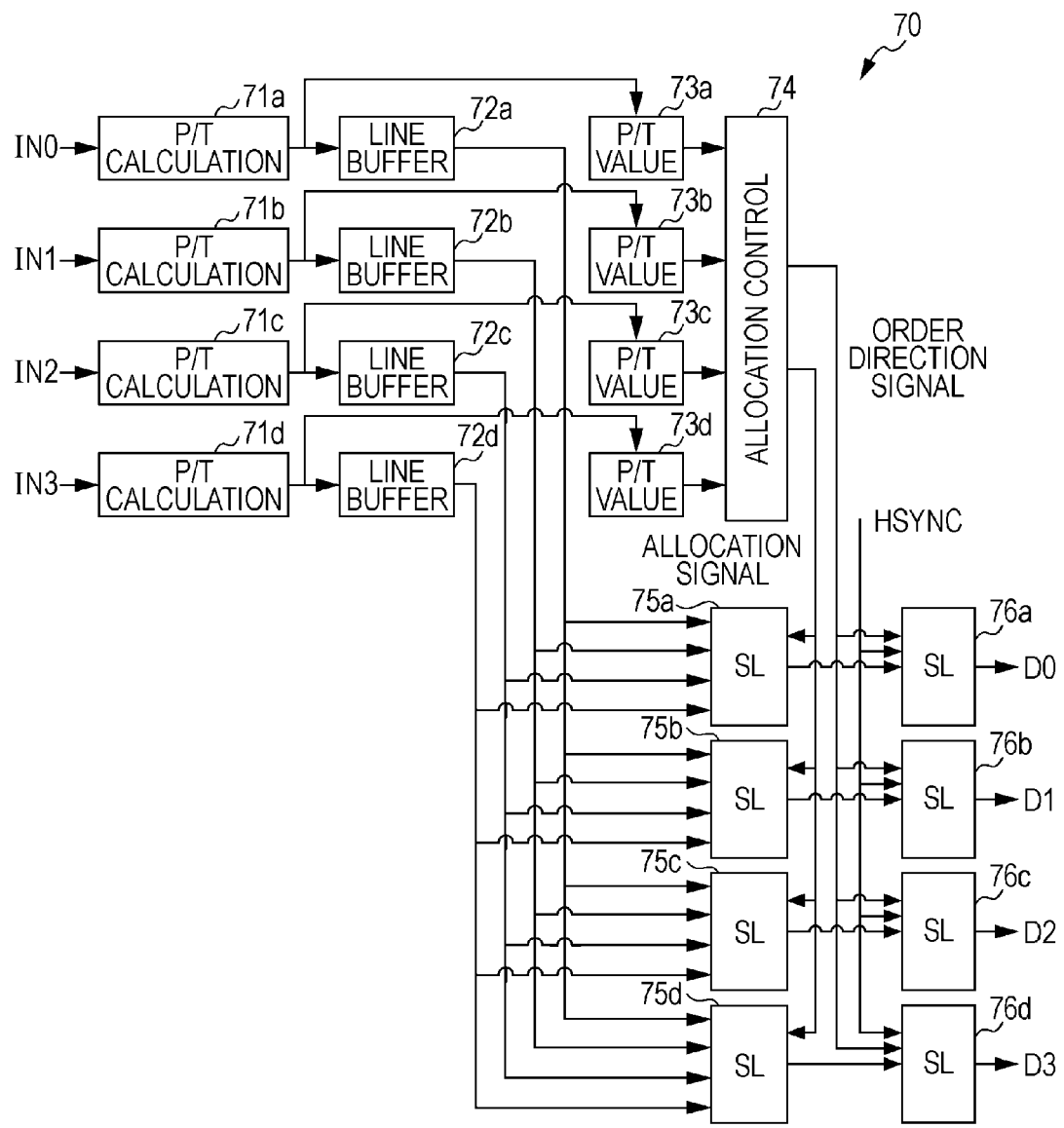
FIG. 6 is a block diagram illustrating functional blocks of a transmission unit.

FIG. 6 is a block diagram illustrating functional blocks of the transmission unit 70. The transmission unit 70 includes four line buffers 72*a* to 72*d*, an allocation controller 74, a selector 75*a*, a selector 76*a*, a selector 75*b*, a selector 76*b*, a selector 75*c*, a selector 76*c*, a selector 75*d*, and a selector 76*d*. The four line buffers 72*a* to 72*d* are connected to four input lines IN0 to IN3 through four P/T calculation units 71*a* to 71*d*, respectively. The four input lines IN0 to IN3 input image data from the LCD controller 60 on the line basis. The allocation controller 74 is connected to four P/T value storage units 73*a* to 73*d*. The four P/T value storage units 73*a* to 73*d* store calculation results of the four P/T calculation units 71*a* to 71*d*, respectively. The selector 75*a* is connected to an allocation signal port of the allocation controller 74 so as to selectively connect the four line buffers 72*a* to 72*d* to the output side in accordance with an allocation signal. The selector 76*a* selectively connects the output side of the selector 75*a* to the signal line D0 and an order specifying port of the allocation controller 74 to the signal line D0. The selector 75*b* is connected to the allocation signal port of the allocation controller 74 so as to selectively connect the four line buffers 72*a* to 72*d* to the output side in accordance with an allocation signal. The selector 76*b* selectively connects the output side of the selector 75*b* to the signal line D1 and the order specifying port of the allocation controller 74 to the signal line D1. The selector 75*c* is connected to the allocation signal port of the allocation controller 74 so as to selectively connect the four line buffers 72*a* to 72*d* to the output side in accordance with an allocation signal. The selector 76*c* selectively connects the output side of the selector 75*c* to the signal line D2 and the order specifying port of the allocation controller 74 to the signal line D2. The selector 75*d* is connected to the allocation signal port of the allocation controller 74 so as to selectively connect the four line buffers 72*a* to 72*d* to the output side in accordance with an allocation signal. The selector 76*d* selectively connects the output side of the selector 75*d* to the signal line D3 and the order specifying port of the allocation controller 74 to the signal line D3. In the embodiment, each of the P/T calculation units 71*a* to 71*d* calculates a P/T value by measuring NO1 as the number of signals of 1 within the data (bit data) input from each of the corresponding input lines IN0 to IN3 and dividing the measured NO1 as the number of signals of 1 by the total number of data NOA.

Figure 7:
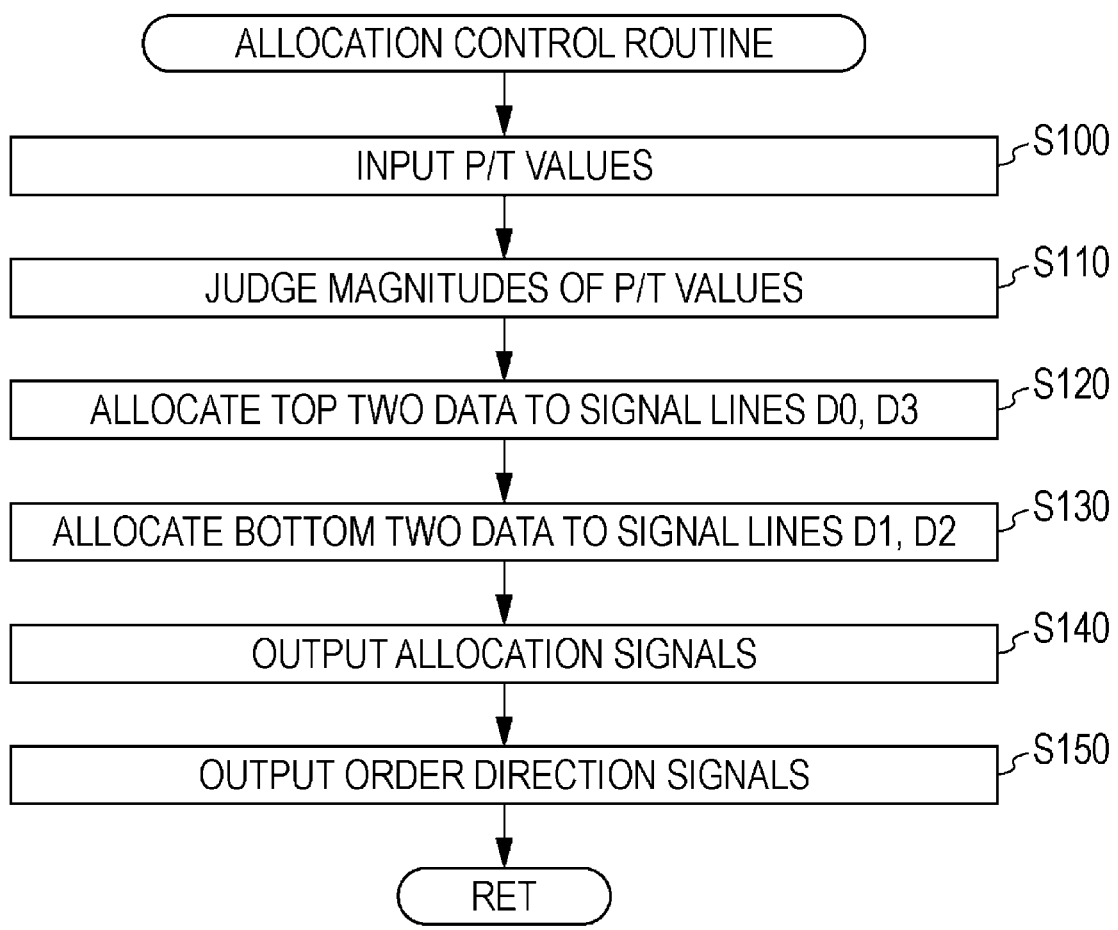
FIG. 7 is a flowchart illustrating an example of an allocation control routine.

FIG. 7 is a flowchart illustrating an example of an allocation control routine executed by the allocation controller 74 of the transmission unit 70. If the allocation control routine is executed, the allocation controller 74 inputs four P/T values stored in the P/T value storage units 73*a* to 73*d*, at first (step S100). Subsequently, the allocation controller 74 identifies top two image data having two larger P/T values among the input four P/T values and bottom two image data having two smaller P/T values thereamong (step S110). The allocation controller 74 allocates the top two image data to the signal lines D0, D3, respectively (step S120) and allocates the bottom two image data to the signal lines D1, D2, respectively (step S130). Then, the allocation controller 74 outputs corresponding allocation signals to the selectors 75*a* to 75*d* such that the line buffers 72*a* to 72*d* and the signal lines D0 to D3 are connected to each other in accordance with each allocation (step S140). Further, the allocation controller 74 outputs order direction signals for notifying the reception unit 80 of a line arrangement order to the corresponding selectors 76*a* to 76*d* (step S150). Then, the routine is ended. In the embodiment, both of the signal lines D0, D3 are arranged so as to be adjacent to the ground lines GND and the signal lines D1, D2 are arranged at positions distanced from the ground lines GND in comparison with the signal lines D0, D3 as illustrated in FIG. 3. Therefore, areas of loops between the ground line GND and the signal line D0 and between the ground line GND and the signal line D3 are smaller than those between the ground line GND and the signal line D1 and between the ground line GND and the signal line D2. That is, noise is hard to generate in signals passing through the signal lines D0, D3 in comparison with signals passing through the signal lines D1, D2. Then, the top two lines (image data) having two larger P/T values are allocated to the signal lines D0, D3 of which loop areas are smaller and the bottom two lines (image data) are allocated to the signal lines D1, D2 of which loop areas are larger. This makes it possible to reduce the entire radiation noise which is generated. Image data allocated to the signal lines D0 to D3 are rearranged based on the P/T values of the image data due to the above reasons.

Figure 8:
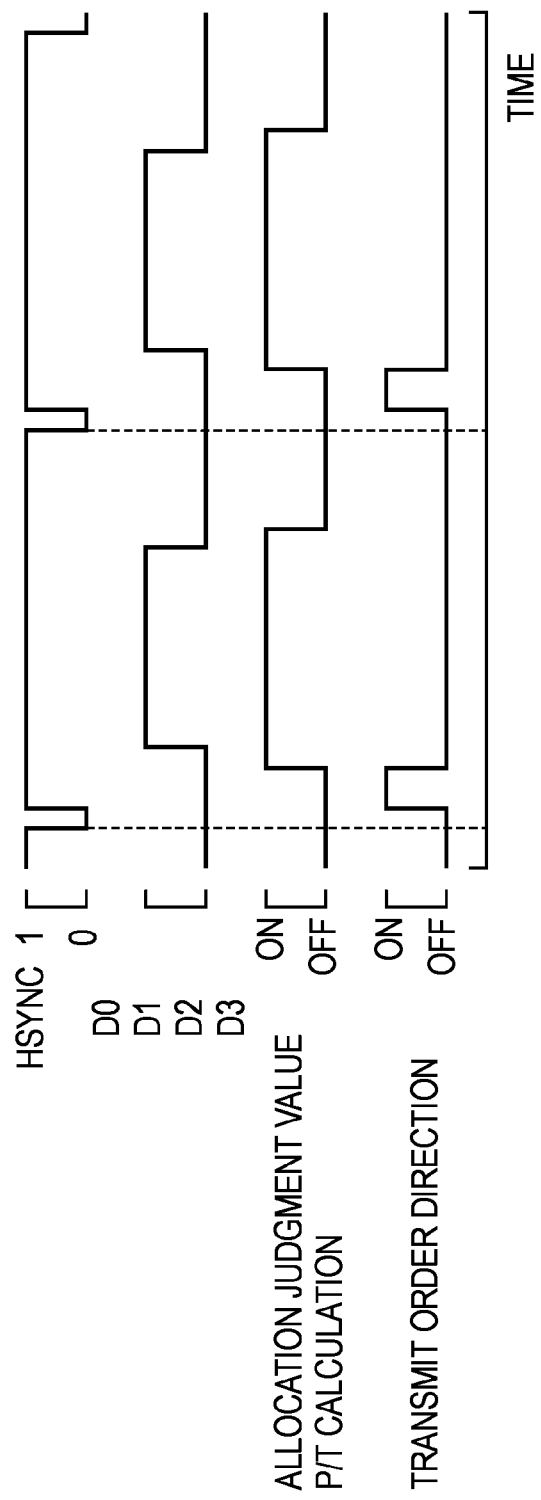
FIG. 8 is a descriptive diagram illustrating states of temporal change of various signals and processings.

FIG. 8 is a descriptive diagram illustrating states of temporal change of transfer of the horizontal synchronization signal HSYNC, transfer of the image signals (D0 to D3), calculation of the allocation judgment values P/T and transmission of the order direction signals. As illustrated in FIG. 8, the transfer of the RGB data is started when the horizontal synchronization signal HSYNC is inverted from 1 to 0. The order direction signals are transmitted before the RGB data is transferred.

Figure 9:
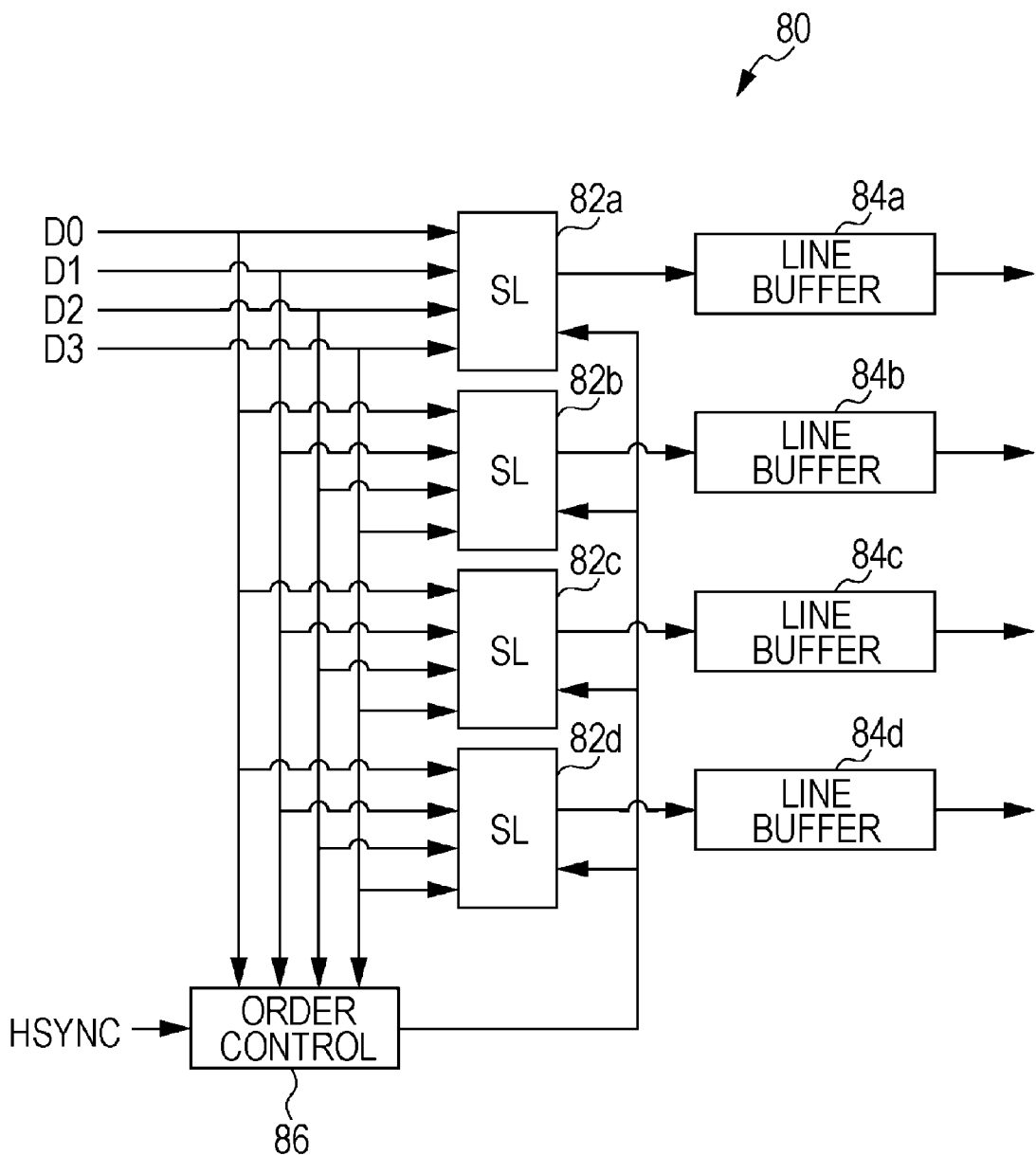
FIG. 9 is a block diagram illustrating functional blocks of a reception unit.

FIG. 9 is a block diagram illustrating functional blocks of the reception unit 80. The reception unit 80 includes a selector 82a, a selector 82b, a selector 82c, a selector 82d, and an order controller 86. The selector 82a selectively connects the signal lines D0 to D3 and the line buffer 84a. The selector 82b selectively connects the signal lines D0 to D3 and the line buffer 84b. The selector 82c selectively connects the signal lines D0 to D3 and the line buffer 84c. The selector 82d selectively connects the signal lines D0 to D3 and the line buffer 84d. The order controller 86 inputs order direction signals from the signal lines D0 to D3 to control each of the selectors 82a to 82d. A case in which a first line is allocated to the signal line D1, a second line is allocated to the signal line D3, a third line is allocated to the signal line D0, and a fourth line is allocated to the signal line D2 and the image data is transmitted from each of the signal lines D0 to D3 by the transmission unit 70 is considered. In this case, the order controller 86 controls the selectors 82a to 82d based on the order direction signal transmitted from the transmission unit 70. To be more specific, the order controller 86 controls the selector 82a such that the signal line D1 and the line buffer 84a are connected to each other. The order controller 86 controls the selector 82b such that the signal line D3 and the line buffer 84b are connected to each other. The order controller 86 controls the selector 82c such that the signal line D0 and the line buffer 84c are connected to each other. The order controller 86 controls the selector 82d such that the signal line D2 and the line buffer 84d are connected to each other. With this, image data of the first line is stored in the line buffer 84a. Image data of the second line is stored in the line buffer 84b. Image data of the third line is stored in the line buffer 84c. Image data of the fourth line is stored in the line buffer 84d. Therefore, the order of the image data is restored to the original order and the image data is transferred to the LCD 25.

Next, correspondences between components according to the embodiment and components according to the invention are made obvious. The liquid crystal display (LCD) 25 according to the embodiment corresponds to a "display unit" according to the invention, the LCD controller 60 corresponds to a "controller", the transmission unit 70 corresponds to a "transmission unit", and the reception unit 80 corresponds to a "reception unit".

According to the printer 20 in the above-described embodiment, when the image data is transferred from the LCD controller 60 to the LCD 25 through the transmission cable 90 and displays an image on a screen, the image data is input sequentially from the front line by a plurality of lines so as to correspond to the number of the signal lines D0 to D3 of the transmission cable 90. Then, a P/T value of the image data on each input line is calculated to set the calculated P/T value as an allocation judgment value P/T. Further, image data of which allocation judgment value P/T is large is allocated to a signal line of which loop area between the signal line and the ground line GND among the signal lines D0 to D3 is smaller so as to be transferred. Therefore, the entire radiation noise which is generated can be reduced while maintaining quality of signals. In addition, the transmission unit 70 transmits an order direction signal for notifying of a line rearrangement order before the image data is transferred. Therefore, the reception unit 80 can previously set connection relationship between the signal lines D0 to D3 and the line buffers 84a to 84d by the selectors 84a to 84d. Accordingly, the order of the lines of the image data can be restored to an original order only by inputting the image data from the signal lines D0 to D3. Further, the P/T value is calculated by measuring NO1 as the number of signals of 1 within the data input from the input lines IN0 to IN3 and dividing the measured NO1 as the number of signals of 1 by the total number of data NOA. Therefore, the P/T value can be derived with a simple processing.

In the above embodiment, a P/T value is calculated every time the image data is input and the image data input is allocated to either of the plurality of signal lines D0 to D3 in accordance with the calculated P/T value. However, the invention is not limited thereto and a P/T value which has been calculated in the past may be used for allocation of subsequent image data.

In the above embodiment, the image data is allocated to the signal lines D0 to D3 on the line basis and transferred to the side of the LCD 25. However, the invention is not limited thereto and the image data may be allocated based on any unit. For example, the data may be allocated on a single frame basis and transferred.

In the above embodiment, image data is allocated to the four signal lines D0 to D3 and simultaneously transferred. However, the invention is not limited thereto and the number of signal lines may be arbitrarily set as long as equal to or more than two signal lines having different loop areas formed between the signal lines and the ground lines are provided.

In the above embodiment, the invention is applied to the printer 20 including the liquid crystal display 25. However, the invention is not limited thereto and may be applied to any devices such as a facsimile machine, a viewer, and a personal computer, for example, as long as the device includes a display. Further, the display is also not limited to the liquid crystal display and may be applied to any displays configured by a plurality of pixels, such as a plasma display or an organic EL display.

It is to be noted that the invention is not limited to the above embodiment and can be carried out in various modes as long as the modes are in the technical range of the invention.

The present invention contains subject matter related to Japanese Patent Application No. 2010-097607 filed in the Japanese Patent Office on Apr. 21, 2010, the entire contents of which are incorporated herein by reference.

What is claimed is:

1. An image display apparatus which includes a display unit and a controller connected to the display unit through a plurality of signal lines and a ground line, and displays an image by transferring an image signal from the controller to the display unit through the plurality of signal lines, comprising:

a transmission unit which is provided at the side of the controller with respect to the signal lines, divides the image signal into up to the number of signal lines in a predetermined order to analyze the divided image signals, and allocates the analyzed image signals to the signal lines such that an image signal of which signal change is larger among the analyzed image signals is allocated to a signal line which is closer to the ground line to transfer the image signals together with correspondence relationship between the image signals and the allocated signal lines to the side of the display unit; and a reception unit which is provided at the side of the display unit with respect to the signal lines inputs the image signals and the correspondence relationship from the transmission unit, restores the input image signals to an original order using the input correspondence relationship to output the image signals to the display unit.

2. The image display apparatus according to claim 1, wherein the transmission unit is a transmitting unit to calculate a ratio of ON signals in one cycle of each of the image signals and allocate the image signals to the signal lines such that an image signal of which calculated ratio is larger is allocated to a signal line which is closer to the ground line to transfer the image signals.

3. The image display apparatus according to claim 1, wherein the transmission unit is a transmitting unit to transfer the correspondence relationship before each of the image signals is transferred.

4. The image display apparatus according to claim 1, wherein the transmission unit is a transmitting unit to divide the image signal on a line basis, and allocate the divided image signals to the plurality of signal lines to transfer the image signals to the reception unit.

5. A method of transferring an image signal from a controller to a display unit through a plurality of signal lines, and the display unit and the controller are electrically connected to each other through a ground line and the plurality of signal lines, comprising the steps of:

transferring an image signal of which signal change is the largest among image signals which are simultaneously transmitted through the signal lines through a signal line which is the closest to the ground line;

dividing the image signal into up to the number of signal lines in a predetermined order;

analyzing the divided image signals and detecting the number of times of signal change in each of the image signals;

allocating the image signals to the signal lines such that an image signal of which signal change is larger is allocated to a signal line which is closer to the ground line;

transferring correspondence relationship between the image signals and the allocated signal lines together with each of the image signals; and restoring the divided image signals to an original order using the correspondence relationship, wherein the steps are executed by a processor.

6. The method according to claim 5, further comprising: calculating a ratio of ON signals in one cycle of each of the image signals; and allocating the image signals to the signal lines such that an image signal of which calculated ratio is larger is allocated to a signal line which is closer to the ground line and transferring the image signals.

7. The method according to claim 5, further comprising: transferring the correspondence relationship before each of the image signals is transferred.

8. The method according to claim 5, further comprising: dividing the image signals on a line basis, and allocating the divided image signals to the plurality of signal lines and transferring the allocated image signals.

* * * * *